Nov. 10, 1959 R. A. SCHUYLER 2,912,179

MAGNETIC SOUND RECORDING MACHINE

Filed May 29, 1958

2 Sheets-Sheet 1

INVENTOR.
Ralph A. Schuyler

BY

K. A. Vaughan

INVENTOR.
Ralph A. Schuyler
BY
[signature]

United States Patent Office 2,912,179

Patented Nov. 10, 1959

2,912,179

MAGNETIC SOUND RECORDING MACHINE

Ralph A. Schuyler, Los Altos, Calif.

Application May 29, 1958, Serial No. 738,695

4 Claims. (Cl. 242—55.12)

The present invention relates to magnetic sound recording machines of the type employing a magnetizable tape as the recording medium. When recording with machines of this type, the tape is taken from a supply reel, conducted past the recording head of the machine, whereat music or information are magnetically imprinted thereon, and is wound upon a take-up reel which may act as the drive mechanism for the tape during the recording operation; and whenever the recorded information or music is to be played back, or whenever it is necessary to correct previously recorded information, the tape must be wound back upon the supply reel, in which case said latter reel may function as the drive mechanism for the tape.

When recording music or information with recording machines, of the type referred to, the tape is usually conducted past the recording head at a relatively slow speed to make clear recordings, but when the tape is to be rewound upon the supply reel, be it for the purpose of readying the tape for play-back or correction, it is desirable that the rewinding operation proceed with the highest permissible speed, and in any case with a speed several times greater than the recording speed, so as to reduce to the lowest possible limit the period of time during which an operator must wait before he may commence correcting, or playing back, previously recorded information.

When the tape with information previously recorded thereon is conducted past the sound head at high speed in the reverse direction, and the electronic part of the machine is set for play-back, the loudspeaker of the machine may produce a chattering or squealing sound which is unpleasant and distracting and which impairs the general appeal and the saleability of the machine during demonstrations of its performance.

It is an object of my invention to provide a sound recording machine, of the type referred to, that will not produce any undesirable noise during the tape-rewinding operation, whether the electronic part of the machine is set for play-back or not.

More particularly it is an object of my invention to provide simple, inexpensive, effective and automatically operative means for silencing any undesirable noises in the loudspeaker of a recording machine during the tape-rewinding operation.

In conventional recording machines of the type here under consideration, the tape-rewinding operation has other defects or disadvantages than the one described above. When the tape passes the sound head at high speed with its magnetizable surface in contact therewith, the tape becomes hot which softens the bonding material of the magnetic particles contained in the magnetizable coating of the tape and causes some of the bonding material with the magnetic particles contained therein to be scraped off and transferred to the sound head. This may not only obscure the information recorded upon the tape and shorten the useful life of the tape in general, it also impairs the efficiency of the sound head and makes it necessary to clean the sound head at frequent intervals.

It is another object of my invention, therefore, to provide an arrangement, whereby the tape and the sound head of the recording machine are protected from damage by contact with each other during high speed rewinding operations.

It is the specific object of my invention, therefore, to provide a magnetic tape recording machine wherein the recording tape may be rewound at high speeds without producing unpleasant noises in the loudspeaker, without excessive wear on the tape or the danger of obscuring information previously recorded thereon, and without impairing the efficiency of the sound head.

These and other objects of my invention will be apparent from the following description of the accompanying drawing which illustrates a preferred embodiment thereof and wherein.

Figure 1:
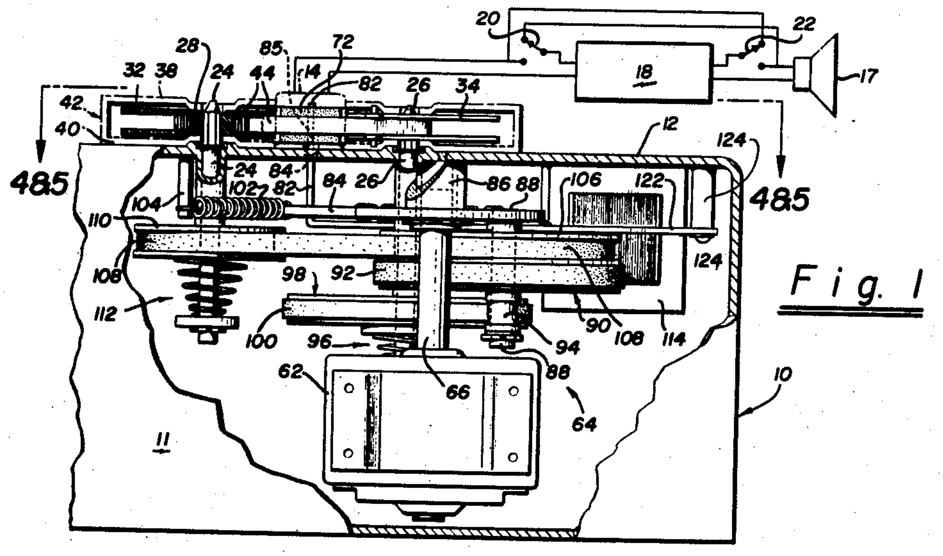
Figure 1 is a fragmentary front elevation of a magnetic sound recording machine embodying my invention with its front panel partially broken away to expose structure situated behind said panel.

The recording machine illustrated in the accompanying drawing comprises a casing 10 which may be made of a suitable plastic material and which has a top panel 12 upon which is mounted the recording and play-back head 14. Said recording and play-back head is connected to a microphone 17, usually located in the front wall of the casing 10, through an amplifier represented by a block 18, in such a manner that it may be employed for both, recording and play-back, depending upon the position of suitable switches 20 and 22, as diagrammatically indicated in Figure 1. Rotatably mounted within the casing 10 and projecting through and a limited distance above the panel 12 is a pair of vertically disposed shafts 24 and 26. Upon the upper ends of said shafts are engaged the tubular hubs 28 and 30 of two reels 32 and 34 which are rotatably mounted in two superposed plates 38 and 40 that form the top and bottom walls respectively of a magazine in the form of a flat box 42 of rounded rectangular conformation. Anchored with its opposite ends in said reels and wound upon both of said reels is a tape 44 of magnetizable material. Vertical guide rollers 46 and 48 held rotatably in the top and bottom walls 38 and 40 of said magazine (Figures 1, 2 and 3) guide the connecting run of said tape between the reels 32 and 34 through a gap 50 in the front wall 54 of the magazine across a recess 55 in said front wall past the recording and play-back head 14, as best shown in Figures 2 and 3.

Supported within the casing 10 is an electric motor 62 (Figures 1, 4 and 5) and an adjustable transmission collectively identified by the reference number 64 is interposed between the output shaft 66 of the motor and the vertical reel shafts 24 and 26. The transmission 64 is constructed in such a manner that it may selectively be set to drive the shaft 26 in a clockwise direction, as viewed in Figures 2 and 3, at a relatively low speed, while shaft 24 is permitted to idle, or to drive shaft 24 in the opposite direction at a relatively high speed while shaft 26 is permitted to idle. Thus, whenever the motor 62 is set into operation, with the recording head 14 set for recording by moving the switches 20 and 22 to the positions shown in full lines in Figure 2, and the transmission 64 is set to turn the shaft 26, said shaft acts as the drive shaft, and the tape is unwound from reel 32, is moved past the recording head 14 at a relatively slow speed to have music or information recorded thereon, and is then wound up upon the reel 34. On the other hand, when it is desired to return part or all of the tape to the supply reel 32 so that the information or music recorded thereon may be played back or that errors may be corrected, the transmission 64 is set to drive the shaft 24 while permitting the shaft 26 to idle. As a result the supply reel 32 turns rapidly in a direction opposite to the direction in which it turned during the recording operation, and winds up the tape 44 in a minimum of time.

Figures 2, 3:
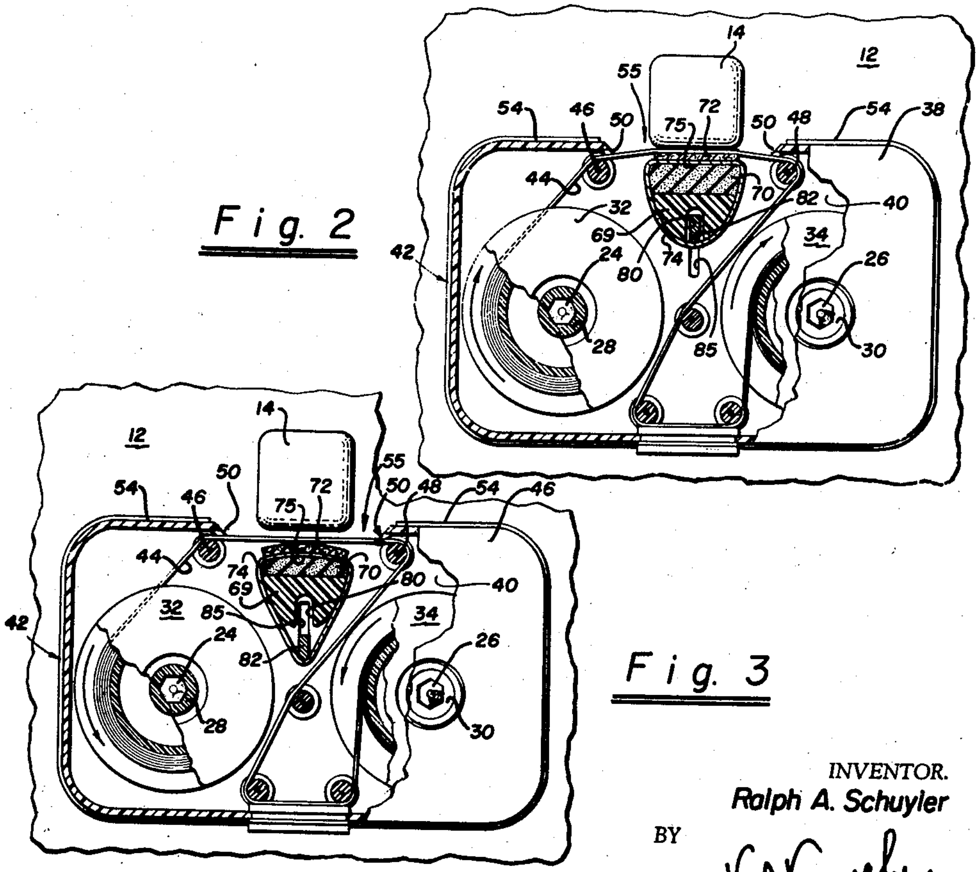
Figure 2 is a fragmentary plan view of the recording machine, with the top wall of the tape magazine partially removed to expose structure underneath.
Figure 3 is a fragmentary plan view of the machine similar to Figure 2, illustrating a different operational position thereof.

To hold the magnetizable tape 44 in operative contact with the sound head 14 of the machine whenever the transmission 64 is set to turn the take-up reel 34 and transport the tape at a relatively slow speed past the recording head, an abutment member 69 is provided in the magazine adjacent the recessed portion of the front wall 54 and carries secured to its outer surface by means of a suitable cement, a cushion 70 of sponge rubber, which is provided with an outer felt covering 72 and which urges the connecting tape run between the reels 32 and 34 yieldably in a direction away from the front face of the abutment member into effective contact with the face of the recording head 14 as shown in Figure 2.

In accordance with the invention I provide means automatically effective, coincident with adjustment of the transmission to its drive-reversing position, to render the cushion 70 unable to urge the tape against the recording head. For this purpose an endless band 74 of nylon or the like is trained around, and may be glued to, the front surface 75 of the rubber cushion behind the felt pad 72. This band encircles loosely the cushion 70 and the abutment member 69 to whose front face said cushion is secured. The abutment member 69 has preferably the contour of a semi-ellipse, when viewed from the top (Figures 2 and 3), whose narrow end points inwardly, and formed into said narrow end thereof is a deep and narrow recess 80 within which is located a stud 82. The stud 82 rises from the interior of the machine through an elongated slot 84 in its top panel 12 (Figure 1) and a congruent slot 85 in the bottom plate 40 of the magazine 42 (Figures 2 and 3) both of which extend rearwardly beyond the confines of the recess 80, and is mounted upon and moves with an element that changes its location whenever the setting of the transmission 64 is reversed. When the transmission 64 is set to drive the take-up reel 34 at a relatively slow speed in a forward direction, the stud 82 is withdrawn into the recess 80 in abutment member 69 and has no effect upon the band around the rubber cushion (Figure 2), but when the transmission is set to turn the supply reel in the reverse direction to rewind the tape, the stud 82 is moved in a direction rearwardly away from the front face of the abutment member and out of the recess 80 in the rear portion thereof; and as it leaves the recess 80, it engages the endless band 74 from the inside and pulls it in a direction away from the recording head 14, as illustrated in Figure 3. This is effective to compress the cushion 70 so that it is unable to urge the tape through the felt pad 72 against the sound head 14, and as a result thereof the connecting tape run between the reels 32 and 34 will assume a straight position across the recess in the front wall of the magazine under the pull exerted upon it by the rapidly rotating supply reel 32 as illustrated in Figure 3. In this condition the tape is spaced from the front face of the sound head as it passes the sound head so that the recording and play-back portion thereof is unable to sense and reproduce messages previously recorded thereon. Also, since there is now no physical contact between the sound head and the rapidly moving tape, the tape cannot become hot and have its magnetizable coating shorn off, nor will the efficiency of the sound head be impaired by deposits of iron oxide and bonding material from the magnetizable coating of the tape. However, as soon as the transmission 64 is returned to its forward position wherein it turns the take-up reel to transport the magnetizable tape at a relatively slow speed past the sound head, the stud 82 releases the endless band 74 and withdraws into the interior of the recess 80 in abutment member 69 (Figure 2). With the band 74 released, the cushion 70 is permitted to expand and urges the tape with the aid of the felt pad 72 again into operative contact with the front surface of the sound head, so that the machine is again in condition to record information upon the tape or reproduce information previously recorded thereon, as the case may be.

Figures 4, 5:
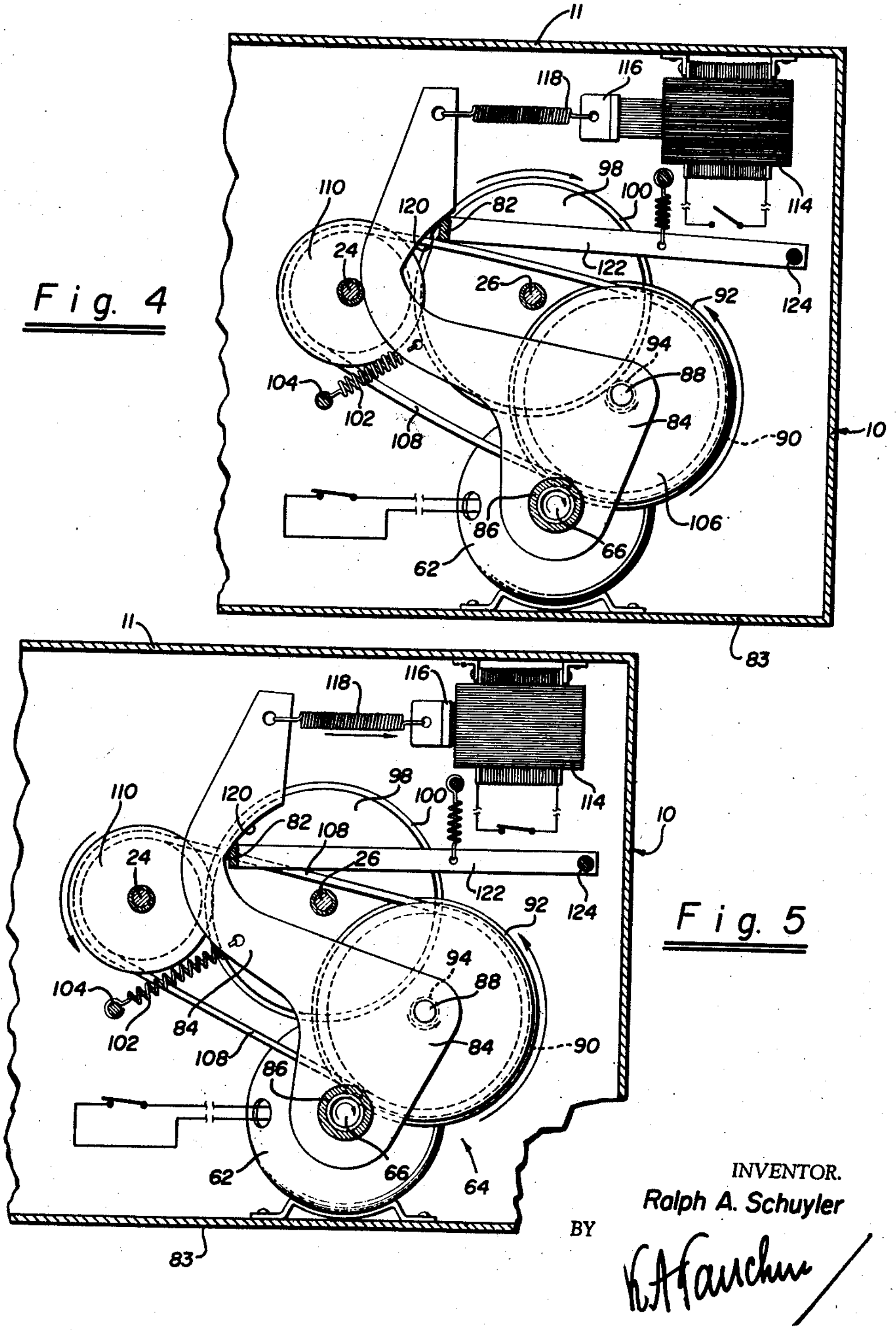
Figures 4 and 5 are horizontal sections through the machine, taken along the line 4—5 in Figure 1, illustrating opposite operational positions of the reversible transmission through which the tape reels of the machine are driven.

As pointed out hereinbefore, the movement of stud 82 out of, and back into, the recess 80 in abutment member 69 is effected by an element that shifts when the setting of the machine is changed from recording or playback condition to rewinding condition, or vice versa. The particular embodiment of the invention which I am about to describe employs a uni-directional motor that is secured to the rear wall 83 of the case 10 with its drive shaft 66 disposed vertically, and the transmission employed to drive either the take-up reel at a relatively slow speed in a forward direction or the supply reel at a relatively high speed in the reverse direction comprises a lever arm 84 that is mounted for rotation about a stubshaft 86 which projects downwardly from the top panel 12 of the machine case, above and coaxially with the drive shaft 66 of motor 62 (Figures 1, 4 and 5). Firmly secured to said lever arm and projecting downwardly therefrom is a spindle 88 upon which is rotatably held a wheel 90 of relatively large diameter. The peripheral edge of said wheel is recessed and carries a rubber tire 92, and the location of the spindle 88 upon lever arm 84 relative to the drive shaft of the motor and the diametrical size of the wheel 90 is so chosen that the rubber tire 92 of the wheel 90 is at all times held in engagement with the drive shaft of the motor irrespective of the rotary position of lever arm 84 upon the stubshaft 86. Projecting downwardly from the center of the wheel 90 and integral therewith is a stud 94, and releasably secured to the lower end of the drive shaft 26 of the take-up reel 34, such as by means of a friction clutch arrangement 96, is a disk 98 of relatively large diameter whose peripheral edge is provided with a rubber tire 100. A spring 102 tensioned between a remote point of the lever arm 84 and an appropriately located stud 104 projecting downwardly from the top panel of the machine case on the counter-clockwise side of the lever arm, urges said arm into the counter-clockwise position shown in Figure 4 wherein the stud 94 engages the tire of disk 98. When the transmission is in this position, and assuming the motor 62 to turn its drive shaft 66 in a clockwise direction as viewed in Figure 4, the transmission will drive the shaft 26 of the take-up reel at a relatively slow speed in clockwise direction because the drive shaft 66 of the motor turns the wheel 90 at a reduced speed in a counter-clockwise direction, and the stud 94 which is integral and turns in unison with the wheel 90, turns the disk 98 at the bottom of the shaft 26 at a still further reduced speed in a clockwise direction.

Mounted upon and integral with the wheel 90 is a pulley 106 of a diametrical size similar to the diametrical size of said wheel, and said pulley 106 is connected by an endless belt 108 with another pulley 110 of somewhat smaller diameter that is releasably secured to the shaft 24 of the supply reel 32, such as by means of a friction clutch arrangement 112. When the lever arm 84 is in the rotary position illustrated in Figure 4, wherein the stud 94 on wheel 90 is in driving engagement with the disk 98 on the reel shaft 26, the belt 108 between the pulleys 106 and 110 is in a slack or loose condition, and the pulley 106 is therefore unable to drive the pulley 110 so that the shaft 24 and the supply reel mounted thereon are free to idle. However, when the lever arm 84 is turned in clockwise direction upon its pivot 86 against the urgency of spring 102, the center point of wheel 90 and hence of pulley 106 is moved farther away from the center point of pulley 110, and as a result thereof the belt 108 is tensioned. The described rotation of the lever arm 84 is simultaneously effective to remove the rotating stud 94 from engagement with the disk 98 on the shaft 26 of the take-up reel 34, as illustrated in Figure 5. Hence, the shaft 24 and the supply reel 32 mounted thereon will now turn in a direction opposite to the direction in which the take-up reel was previously driven, and at a considerably greater speed than the take-up reel was turned before, because the driving pulley 106 on wheel 90 is of larger diameter than the pulley 110 on shaft 24, whereas the driving stud 94 was of a very much smaller diameter than the disk 98. Thus, the clockwise rotation of the lever arm 84 upon the shaft 26 of the take-up reel from the position illustrated in Figure 4 to the position illustrated in Figure 5 effects a reversal in the operation of the machine from a condition wherein the magnetizable tape is conducted at a relatively slow speed in a forward direction past the sound head to a condition wherein it is conducted at a rapid speed in the reverse direction.

In the particular embodiment of the invention which I am about to describe, the operation-reversing movement of the lever arm 84 is effected by energization of a solenoid 114 which is located on the clockwise side of said arm and whose normally projected armature 116 is connected to the free end of said arm by a coil spring 118. In accordance with my invention I employ the described operation-reversing movement of the lever arm 84 is effected by energization of a solenoid 114 which is located on the clockwise side of said arm and whose normally projected armature 116 is connected to the free end of said arm by a coil spring 118. In accordance with my invention I employ the described operation-reversing movement of the lever arm 84 from the position illustrated in Figure 4 to the position illustrated in Figure 5 to move the hereinbefore described tape control stud 82 from the position shown in Figure 2 to the position shown in Figure 3.

For this purpose the free end of lever arm 84 forms in its clockwise side an oblique camming edge 120 (Figures 4 and 5) and the tape control stud 82 is mounted upon the free end of an elongated lever arm 122 that turns upon a pin 124 which may be mounted in and project downwardly from the top panel 12 of the machine case (Figure 1). A spring 126 holds said lever arm 122 into a position wherein the tape control stud 82 bears against the camming edge 120. When the solenoid 114 is in de-energized condition and the spring 102 holds the operation-reversing lever 84 in the operational position illustrated in Figure 4, wherein the take-up reel transports the tape at a relatively slow speed in a forward direction past the recording head 14, the stud 82 is in a position relatively close to the front wall 11 of the machine casing, as likewise illustrated in Figure 4. This places its upwardly projecting end into the recess 80 of abutment member 69 as illustrated in Figure 2, wherein it has no effect upon the band 74 that encircles the cushion 70. As a result thereof, the cushion 70 is fully effective to urge the tape into operative contact with the sound head of the machine. When the solenoid 114 is energized, however, to reverse the operation of the machine, and moves the control lever 84 into the position illustrated in Figure 5, the clockwise movement of said control lever causes the camming edge 120 thereof to cam the tape control stud 82 upon lever 122 into a position further removed from the front wall of the machine case, as likewise illustrated in said Figure 5. This moves the upwardly projecting end of the control stud out of the recess 80 in abutment member 69 against the rear portion of the endless band 74 and tensions said band, as illustrated in Figure 3, so that the cushion 70 is compressed against the front surface of the abutment member 69 and is unable to urge the tape into operative contact with the sound head of the machine. As a result the tape may now form a straight run from the point where it emerges from the magazine to the point where it re-enters the magazine which removes it from effective contact with the sound head, as likewise illustrated in Figure 3.

Thus, when the machine is set to move the tape at high speed in a reverse direction past the sound head to rewind it upon the supply reel, the tape is effectively removed from the sound head so that it cannot produce any response in the sound reproduction system of the machine, and as a result thereof no squeal, chatter or similar unpleasant noise will be produced in the microphone whenever the tape is rewound, even if the electronic part of the machine should happen to be set for sound reproduction. Also, since there is no physical contact between the tape and the sound head of the machine during the rewinding operation, there is no danger that the tape may become hot and that parts of its magnetizable coating be scraped off and transferred to the sound head. Hence, information previously recorded upon the tape is preserved and the life time of the tape as a whole is prolonged; also it is no longer necessary to clean the recording head at frequent intervals to maintain it at peak performance.

The described means for eliminating unpleasant noises in the microphone of a tape recording machine during the tape-rewinding operation and for safeguarding the tape and the sound head of the machine and preserving information previously recorded on the tape are highly effective, yet they are extremely simple and inexpensive and require a minimum of additional components in the machine.

While I have described my invention with the aid of a specific embodiment thereof, it will be understood that the invention is not limited to the specific constructional details shown and described by way of example, which may be departed from without departing from the scope and spirit of the invention.

I claim:

1. A magnetic recording machine comprising a pair of reels, a magnetizable tape wound upon said reels and extending from one reel to the other, a sound head located at one side of the connecting tape run between said reels in a position normally spaced from said connecting tape run, a body of elastic material located at the other side of said connecting tape run in a position effective to urge said connecting tape run into operative contact with said sound head, drive means selectively operable to drive said reels in one direction at a relatively low speed and in the opposite direction at a relatively high speed, a band trained loosely about said body of elastic material, and means effective coincident with the setting of said drive means to a position wherein it drives said reels at a relatively high speed in the opposite direction for tensioning said band to compress said body of elastic material and thus render it ineffective to urge said connecting tape run into operative contact with said sound head.

2. A magnetic recording machine comprising a supply reel, a take-up reel, a magnetizable tape wound upon said reels and extending from one reel to the other, a sound head located adjacent the connecting tape run between said reels at one side of said tape run, a body of elastic material located adjacent said connecting tape run at the opposite side thereof in a position effective to urge said connecting tape run into operative contact with said sound head, drive means for said reels including a lever selectively settable to a first position wherein said drive means turns said take-up reel in a forward direction at a relatively low speed and a second position wherein said drive means turns said supply reel in the reverse direction at a relatively high speed, an endless band trained loosely around said body of elastic material, and a member extending into the space within said endless band and operative in response to the setting of said lever to said second position to tension said endless band in a direction away from said sound head so as to render said body of elastic material ineffective.

3. A tape magazine for use on magnetic recording machines of the type employing a magnetizable tape as recording medium comprising a base plate having a recessed front edge, a pair of reels rotatably supported upon said base plate, a magnetizable tape wound upon said reels with the connecting rum between said reels extending across the recessed portion of the front edge of said plate, an abutment member mounted upon said plate adjacent the recessed portion of its front edge, a body of elastic material secured to the outer face of said abutment member behind said connecting tape run so as to urge said connecting tape run yieldably in a direction away from said abutment member, and an endless band trained around said body of elastic material and said abutment member, said abutment having a recess provided at a point opposite to its front face and said base plate having a slot formed in alignment with and extending rearwardly beyond the confines of said recess.

4. A tape magazine for use on magnetic recording machines of the type employing a magnetizable tape as recording medium comprising a base plate having a recessed front edge, a pair of reels rotatably mounted upon said plate at either side of the recess in the front edge thereof, a magnetizable tape wound upon said reels with the connecting run between said reels extending across the recess in the front edge of said plate, an abutment member mounted upon said plate adjacent the recessed portion of its front edge, a cushion of sponge rubber secured to the front face of said abutment member behind said connecting tape run to urge said connecting tape run yieldably in a direction away from the front face of said abutment member into contact with the sound head of the recording machine upon which the tape magazine may be mounted, and an endless band trained around the front face of said cushion of sponge rubber and said abutment member, said abutment member having a recess in its circumference at a point opposite to its front face and said base plate having a slot in vertical alignment with said recess, but extending rearwardly beyond the confines of said recess, for the reception through said slot into said recess of an actuating stud for movement against the inside of said endless band to tension said band and cause it to compress the cushion of sponge rubber against the front face of said abutment member.

References Cited in the file of this patent

UNITED STATES PATENTS

| | | |
|---|---|---|
| 2,558,432 | Haloski | June 26, 1951 |
| 2,768,244 | Tiger | Oct. 23, 1956 |
| 2,778,580 | Howell et al. | Jan. 22, 1957 |
| 2,782,263 | Hoehn et al. | Feb. 19, 1957 |